(12) United States Patent
Berkema et al.

(10) Patent No.: US 7,941,665 B2
(45) Date of Patent: May 10, 2011

(54) DEVICE PAIRING

(75) Inventors: Alan C. Berkema, Granite Bay, CA (US); Scott V. Hansen, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1809 days.

(21) Appl. No.: 10/728,495

(22) Filed: Dec. 5, 2003

(65) Prior Publication Data

US 2005/0125664 A1 Jun. 9, 2005

(51) Int. Cl.
*H04L 9/32* (2006.01)
(52) U.S. Cl. ....................................................... 713/171
(58) Field of Classification Search .................. 713/150, 713/171; 455/41.2
See application file for complete search history.

(56) References Cited

U.S. PATENT DOCUMENTS

| | | | | |
|---|---|---|---|---|
| 6,526,130 B1* | 2/2003 | Paschini | | 379/93.12 |
| 6,748,195 B1* | 6/2004 | Phillips | | 455/41.2 |
| 6,772,331 B1* | 8/2004 | Hind et al. | | 713/151 |
| 6,845,097 B2* | 1/2005 | Haller et al. | | 370/352 |
| 7,130,584 B2* | 10/2006 | Hirvonen | | 455/41.2 |
| 7,216,231 B2* | 5/2007 | Gehrmann | | 713/171 |
| 2002/0090912 A1* | 7/2002 | Cannon et al. | | 455/41 |
| 2003/0065918 A1* | 4/2003 | Willey | | 713/168 |
| 2003/0105963 A1* | 6/2003 | Slick et al. | | 713/171 |
| 2005/0015618 A1* | 1/2005 | Schneider et al. | | 713/201 |

* cited by examiner

*Primary Examiner* — Nasser Moazzami
*Assistant Examiner* — Daniel L Hoang

(57) ABSTRACT

A method embodiment for publishing a PIN for use in establishing a pairing with a printing device, including the printing device generating the PIN in response to a local PIN request. Once the PIN is generated, the printing device prints the PIN. Another method embodiment includes identifying a local request to print a test page as a local PIN request and then printing a test page that includes the PIN.

27 Claims, 6 Drawing Sheets

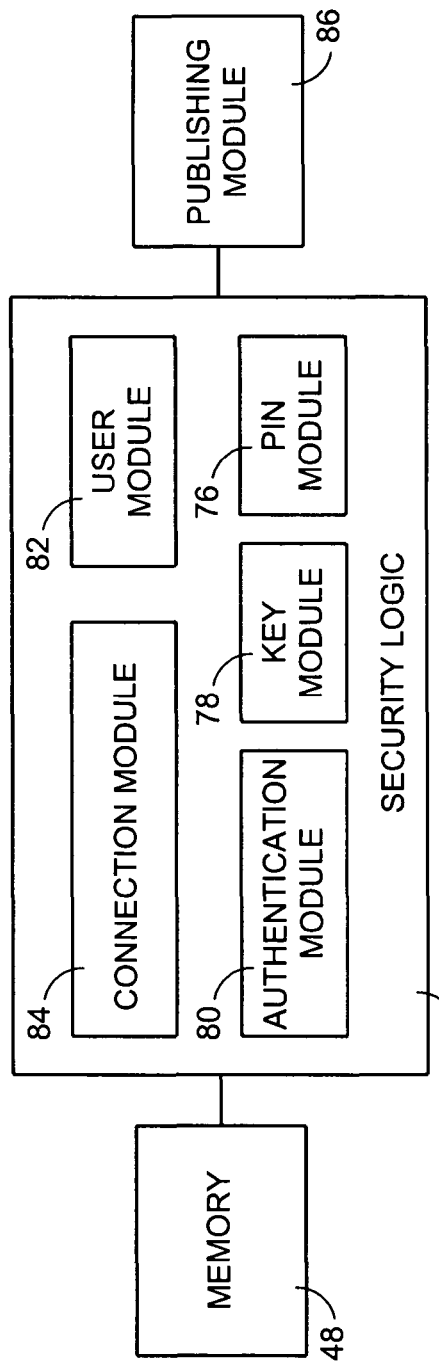

DEVICE PAIRING

BACKGROUND

Technology enabling wireless communication between electronic devices is evolving daily. Bluetooth is an emerging wireless radio communication protocol for establishing device "p airings." A pairing, for example, can be between a mobile phone and a headset, a mouse and a personal computer, or a PDA (personal digital assistant) and a printer. Once paired, devices are able to interact as if they were physically connected. This assumes, of course, that the paired devices remain within communication range with one another.

The Bluetooth protocol uses well known security procedures to establish and then maintain a device pairing. To establish a pairing, an authentication process is performed in which at least one of the devices (the verifying device) confirms that the other (the claimant device) is authorized for interaction. Each Bluetooth device has a unique device address. Paired devices share a symmetric link key. To authenticate, the claimant device uses its device address and the link key to generate a first password that it sends on to the verifying device. The verifying device uses its copy of the link key and the address of the claimant device to generate a second password. Authentication occurs when the first and second passwords match.

Prior to being paired, the claimant device and the verifying device do not share a link key. In this case, a code (referred to as a PIN) is used to generate the link key. To work, the same PIN must be supplied to both devices. The claimant device generates the link key using its device address and the PIN. Likewise, the verifying device generates its copy of the link key using the PIN and the address of the claimant device. Where, for example, the claimant device is a PDA and the verifying device is a cell phone, identical PINs can be entered through the PDA's touch screen and the cell phone's keypad.

Some devices have no or limited user interface capabilities making it difficult or impossible to enter a PIN. At least two solutions have been developed for this problem. An example of one solution involves a wireless headset for mobile telephone. It is desirable for a mobile phone user to establish a secure connection between the headset and the handset. The PIN is preprogrammed into the headset at the factory. The PIN is usually a short series of numbers like "1234" or "0000." The user enters these numbers into the handset using the handset's user interface to complete authentication. While this does create a secure link key, it is not a strong way to use the Bluetooth security mechanisms. It has at least two major weaknesses: (1) the PIN is well known and the same for anyone who purchases a headset, and (2) the PIN is short.

Another example involves a Bluetooth enabled wireless printer that is attached to a computer with a cable. A software configuration utility resides on the computer and allows a PIN number to be set by the user and stored on the printer. Any device wishing to connect to the printer must know this PIN value. While this creates a secure link key, it also has major weaknesses: (1) The PIN is usually short, (2) the printer must be connected to a PC via a cable to set the PIN number, and (3) the same PIN number is used each time a new pairing is established between a device and the printer.

While no security scheme is perfect, the Bluetooth security mechanism is deemed "computationally secure". However, the computational methods that might crack the Bluetooth security mechanism are simplified if the PIN is short or the PIN is well known. Moreover, when a cable is required to set the PIN on a wireless device, many of the benefits of a wireless device are lost.

What is needed is an improved method and system for generating a more secure PIN for use by devices with limited user interface capabilities.

DESCRIPTION OF THE DRAWINGS

FIG. 3 is a block diagram showing security logic program elements according to an embodiment of the present invention.

FIG. 4 illustrates a PIN table according to an embodiment of the present invention.

DETAILED DESCRIPTION

INTRODUCTION: A claimant device and a verifying device can be deemed paired when they each share a link key enabling the claimant device to interact with the verifying device. Where one of the devices has limited or no user interface capabilities, it is difficult to supply that device with the information (referred to as a PIN) needed to generate an initial link key. Various embodiments of the present invention give that device (the verifying device) the responsibility of generating and publishing the PIN. The PIN can then be entered through a user interface of the claimant device to establish a pairing between the claimant device and the verifying device.

The description that follows is broken into sections. The first section, labeled "environments," describes exemplary environments in which various embodiments of the present invention can be implemented. The second section, labeled "components," describes exemplary logical and physical elements used to implement various embodiments of the present invention. The third section, labeled "operation," describes exemplary steps taken to practice various embodiments of the present invention.

Figure 1A:
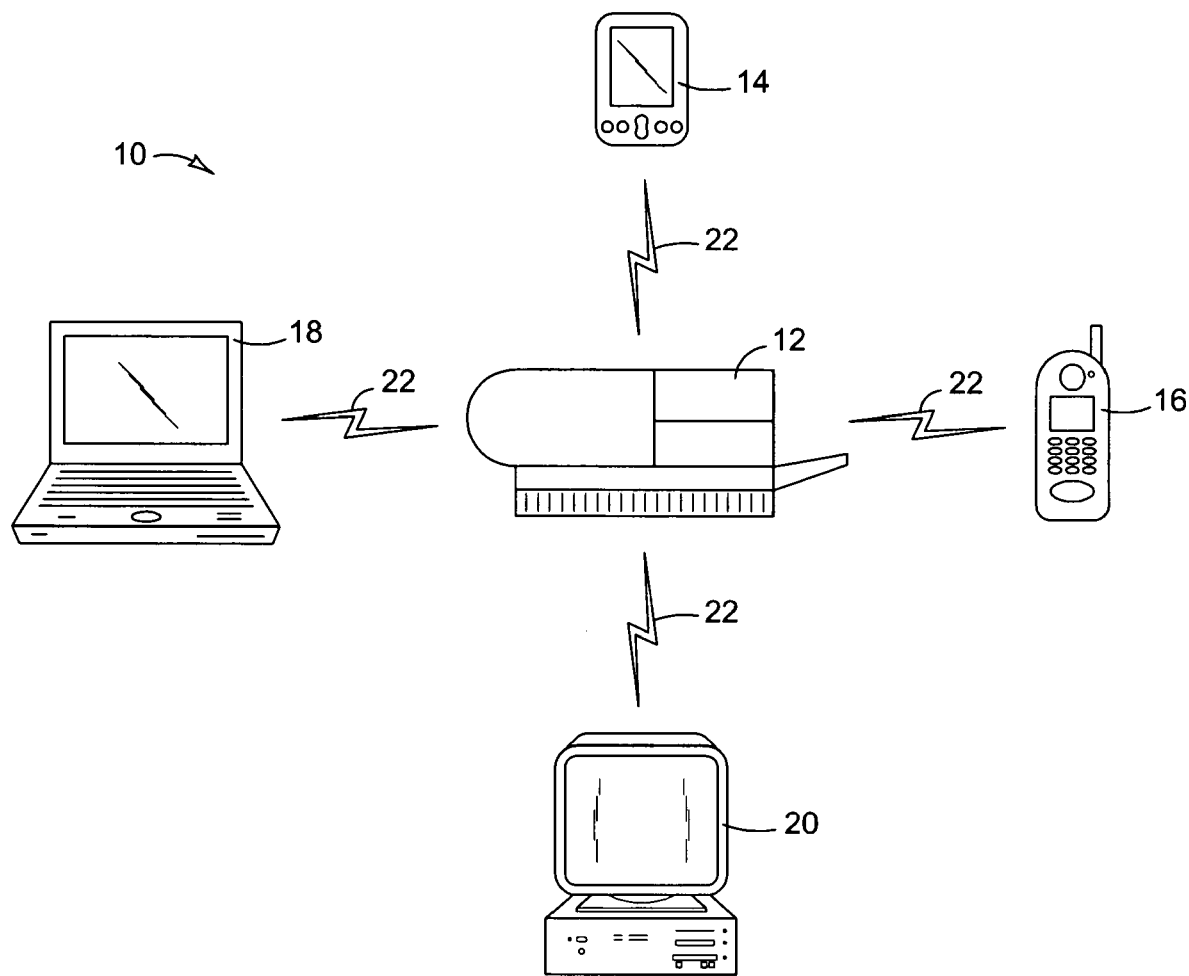
FIGS. 1A-1C illustrate exemplary environments in which embodiments of the present invention can be implemented.
Figure 1B:
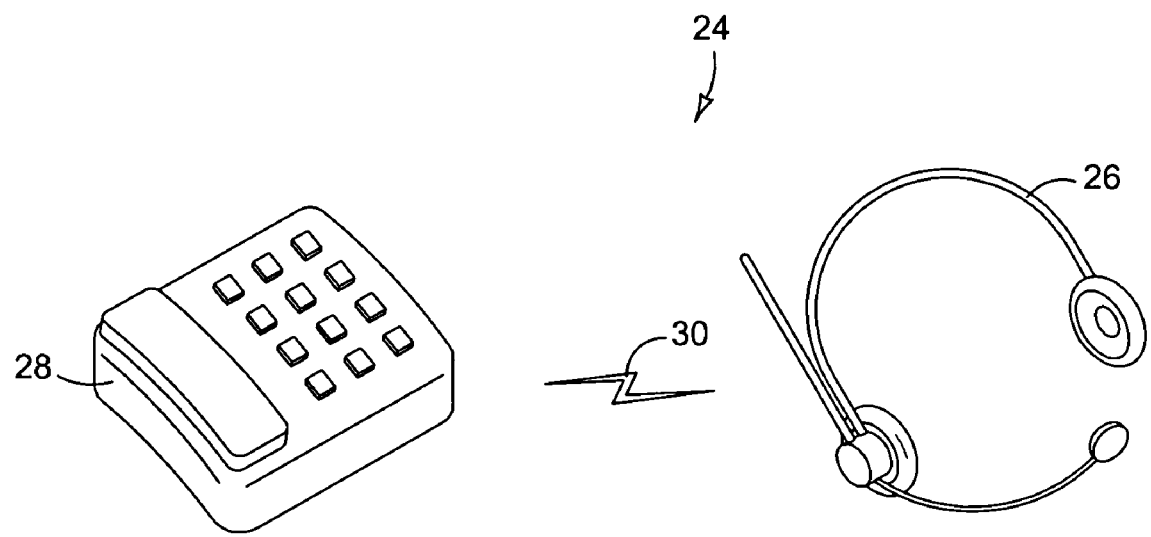
Figure 1C:
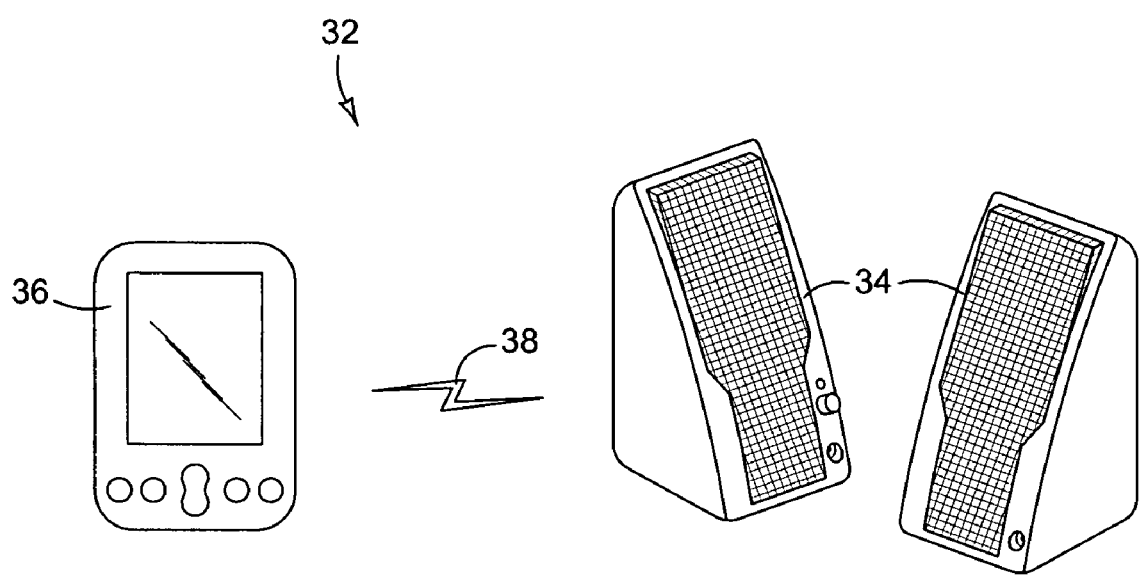

ENVIRONMENTS: FIGS. 1A-1C illustrates exemplary environments in which various embodiments of the present invention can be implemented. Referring first to FIG. 1A, environment 10 includes, verifying device 12 and claimant devices 14-20. The term claimant is used to describe a device that requests that another device perform a specified function. The claimant device, when making a request, claims that it is authorized to make the request. The device requested to perform the function is the verifying device. The verifying, before performing the function, verifies that the claimant device is in fact authorized. Here, verifying device 12 is a printer 12 while claimant devices 14, 16, 18, 20, respectively, are a PDA (Personal Digital Assistant), a mobile phone, a laptop computer, and a personal computer.

Devices 14-20 are connected to verifying device 12 via link 22. Link 22 represents generally a cable, wireless or remote connection via a telecommunication link, an infrared link, a radio frequency link or any other connector or system of connectors that provides electronic communication. Link 22 may include an intranet, the Internet, or a combination of both. Each portion of link 22 connecting a given claimant device 14-20 to verifying device 12 may or may not be distinct from the remaining portions of link 22.

In the example of FIG. 1A, four device pairings are possible—one between each of the four claimant devices 14-20 and verifying devices 12. Once a given claimant device 14-20 is paired with verifying device 12, that claimant device can request that the verifying device 12 (in this case a printer) perform a specified printing function.

Referring now to FIG. 1B, environment 24 includes verifying device 26 (a telephone headset) and claimant device 28 (a telephone base unit). Devices 26 and 28 are interconnected by link 30. Link 30 represents a wireless connection via an infrared link, a radio frequency link or any other means of wireless communication. Once paired, the base unit and the head set can interact, and the base unit can request that the headset audibly publish a telephone conversation for a user to hear. In this example, the head set can also be a claimant device and the base unit a verifying device. Once paired, the headset can request that the base unit receive and electronically retransmit the user's voice.

Moving to FIG. 1C, environment 32 includes verifying device 34 (speakers) and claimant device 36 (a PDA). Devices 34 and 36 are interconnected by link 38. Link 38 represents a wireless connection via an infrared link, a radio frequency link, or any other means of wireless communication. Once paired, the PDA can request that the speakers produce a specified sound or sounds. For example, the PDA could use the speakers to broadcast a music file.

Verifying devices 12, 26, and 34 in FIGS. 1A-1C have limited user interface capabilities. Usually, none of devices 12, 26, and 34 have a key pad that would enable a user to enter a PIN. Various embodiments of the present invention will enable devices like verifying devices 12, 26, and 34 to generate and publish a PIN that can be entered by a user on claimant devices 14-20, 28, and 36. Once a user enters a PIN in a given claimant device 14-20, 28, or 36, a pairing can automatically be established between that device and the particular verifying device 12, 26, or 34 that generated the PIN.

Figure 2:
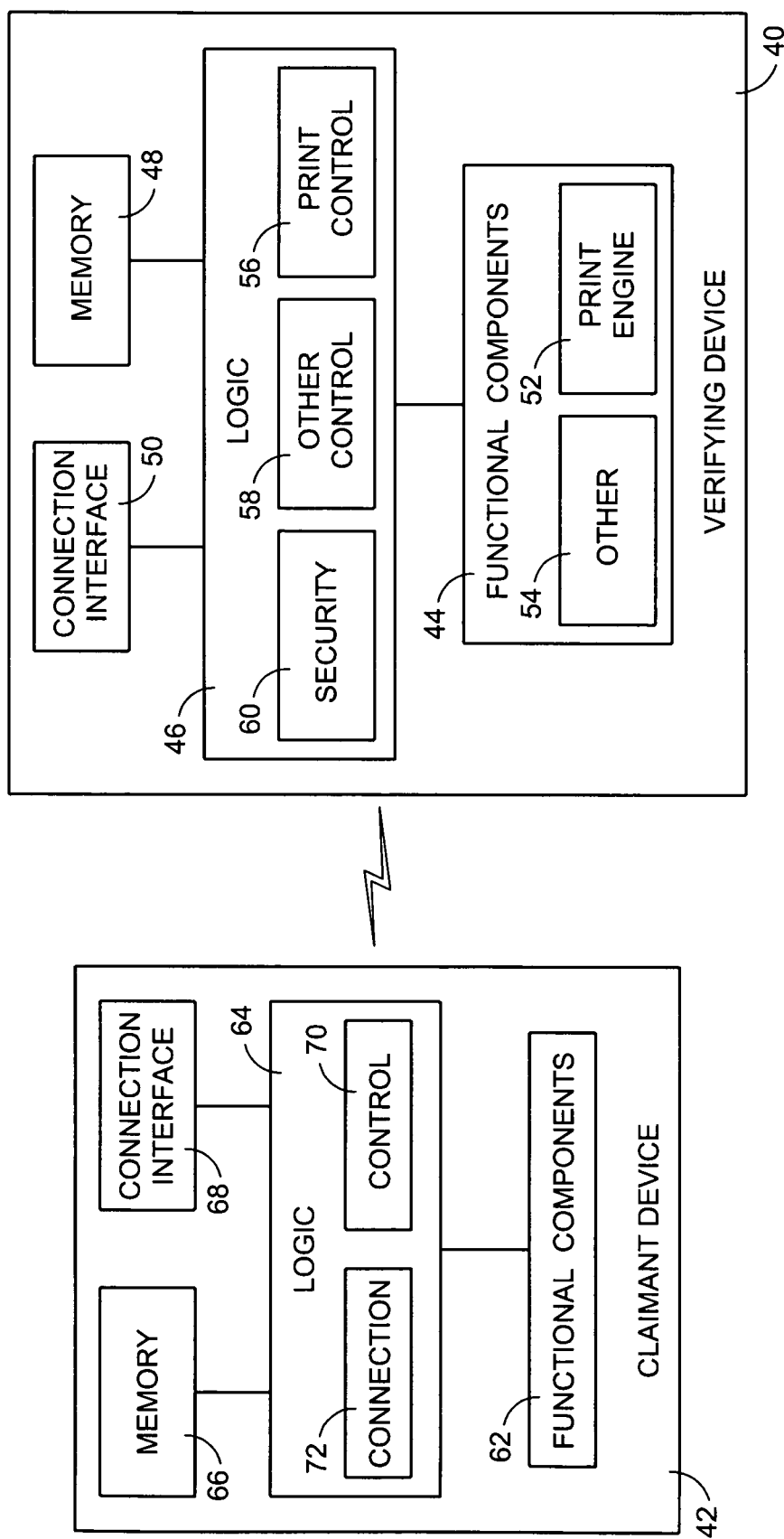
FIG. 2 is a block diagram showing physical and logical components of a claimant and a verifier according to an embodiment of the present invention.

COMPONENTS: FIG. 2 is an exemplary block diagram showing the physical and logical components of an exemplary verifying device 40 and an exemplary claimant device 42. Here, verifying device 40 is a printing device, while claimant device 42 can be any device capable of utilizing the printing functions offered by verifying device 40.

Verifying device 40 includes functional components 44, logic 46, memory 48, and connection interface 50. Functional components 44 represent generally the physical components capable of performing the functions for which verifying device 40 is designed. Logic 46 represents the programs capable of directing functional components 44. Memory 48 represents generally any memory capable of being utilized by logic 46 and functional components 44.

As shown, functional components 44 includes print engine 52 and other components 54. Print engine 52 represents generally any hardware capable of forming a printed image on paper or other media. For example, where verifying device 40 is a laser or ink printer, print engine 52 includes all the electro-photographic and paper handling components required to, under the direction of logic 46, retrieve a sheet from an input tray, fix toner or ink to the sheet in the form of a desired image, and pass the sheet to an output bin.

Other components 54 represents all other hardware needed by verifying device 40 to perform tasks for which verifying device 40 was designed. Other components 54 includes a microprocessor for executing logic 46. In addition to performing printing functions, verifying device 40 might also operate as a scanner, copier, and facsimile device. In this case, other components 54 would also include the hardware needed to perform those functions.

Logic 46 includes print control logic 56, other control logic 58, and security logic 60. Print control logic 56 represents programs capable of processing a print request received from a claimant device 42 and directing print engine 52 to print a desired image according to the processed request. Other control logic 58 represents programs capable of directing other components 54. Security logic 60, described in more detail with reference to FIG. 3, represents programs capable of helping to establish and maintain a pairing between verifying device 40 and claimant device 42.

Claimant device 42 includes functional components 62, logic 64, memory 66, and connection interface 68. Functional components 62 represents generally the physical components capable of performing the functions for which claimant device 42 is designed. Logic 64 represents programs capable of directing functional components 62. Logic 64 might include a word processor, while functional components 62 might include a processor for executing logic 64 and a display for presenting a graphical user interface. Memory 66 represents any memory capable of being utilized by logic 64 and functional components 62. Connection interface 68 represents generally any hardware and programming enabling claimant device 42 to interact with verifying device 40.

As shown, logic 64 includes control logic 70 and connection logic 72. Control logic 70 represents programs capable of directing functional components. For example, control logic might include a word processor and an operating system. Control logic 70 could then direct a display to present a user interface for entering text. Control logic 70 could then issue a command to print—instructing that the print command be directed through connection interface 68 to verifying device 40. Connection logic 72, described in more detail with reference to FIG. 4, represents programs capable of helping to establish and maintain a pairing between claimant device 42 and verifying device 40.

FIG. 3 is an exemplary block diagram illustrating the logical components of security logic 60. Here, security logic 60 includes PIN module 76, key module 78, authentication module 80, user module 82, and connection module 84. PIN module 76 represents generally any program capable of generating a PIN. A PIN can be a simple numeric string or a more complex alphanumeric string. PIN module 76 is also responsible for associating a generated PIN with expiration data. Expiration data is data used to specify circumstances under which a generated PIN is no longer valid. For example, a PIN may be valid only during a set time window. PIN module 76 is also responsible for associating access data with a generated PIN. Access data is used to specify the functions provided by verifying device 40 that are to be made available to a claimant device supplying corresponding PIN data. For example, where verifying device 40 (FIG. 2) is equipped to supply printing and faxing functions, access data may indicate that access is to be limited to only one of the two available functions. Where verifying device 40 is equipped to print color and black and white, access data may indicate that access is limited to black and white printing.

Key module 78 represents a program capable of generating a link key using PIN data and maintaining data relating to a pairing established with verifying device 40. When generating a link key, key module 78 may also use other data such as a device address for claimant device 42 (FIG. 2). Authentication module 80 represents generally any program capable of determining if PIN data received from claimant device 42 is valid. PIN data may be a PIN or a PIN modified using other data such as the device address of claimant device 42. Authentication module 80 is also responsible for determining the validity of a link key received from claimant device 42. User module 82 represents generally any program capable of maintaining data identifying one or more claimant devices authorized for pairing with verifying device 40. Connection module 84 represents generally any program capable of receiving and responding to a connection request directed to verifying device 40.

Security logic 60 has access to memory 48 and publishing module 86. Publishing module 86 represents generally any programming capable of utilizing functional components 44 (FIG. 2) to publish a PIN generated by PIN module 76. As used here, the term publishing means to make that, which is published, known to a user of a claimant device such as a user of claimant device 42. Publishing module 86 may be a part of logic 46 and/or functional components 44.

Referring back to FIG. 2, publishing module 86 may be part of print control logic 56. For example, publishing module 86 might be a program capable of directing print engine 52 to print a test page that includes a PIN generated by PIN module 76. In this case verifying device 40 will include a button or buttons that, when properly pressed, direct verifying device 40 to print a test page. In doing so, publishing module 86 informs security logic 60 that a test page has been requested. PIN module 76 generates and supplies publishing module 86 with a PIN. Publishing module 86 then directs print engine 52 to print a test page that includes the PIN.

In an alternative embodiment, security logic 60 and publishing module 86 are components of a verifying device capable of producing audible sounds—a voice for example (see verifying devices 26 and 34 in FIGS. 1A and 1B). Publishing module 86 might then be a part of the logic used to guide verifying device 26 or 34 in the production of sound. For example, publishing module 86 could be a program capable of directing verifying device 26 or 34 to produce an audible voice message that includes a PIN generated by PIN module 76. In this case verifying device 26 or 34 will include a button or buttons that, when properly pressed, direct verifying device 26 or 34 to broadcast an audible voice message. In doing so, publishing module 86 informs security logic 60 that a voice message has been requested. PIN module 76 generates and supplies publishing module 86 with a PIN. Publishing module 86 then directs verifying device 26 or 34 to broadcast a voice message that includes the PIN. Instead of a voice, the request message may include an audible code such as Morse code.

In another alternative embodiment, security logic 60 and publishing module 86 are components of a verifying device (not shown) having a lighted numeric keypad. Publishing module 86 might then be a part of the logic used to direct which keys on the keypad are lighted. For example, publishing module 86 could be a program capable of directing that individual keys be lighted in a sequential order that matches a PIN generated by PIN module 76. In this case the verifying device (not shown) will include a button or buttons that, when properly pressed, direct pin module 76 to generate and supply publishing module 86 with a PIN. Publishing module 86 then directs the lighting of the numeric keys to reveal the PIN to a user.

Figures 5, 6, 7:
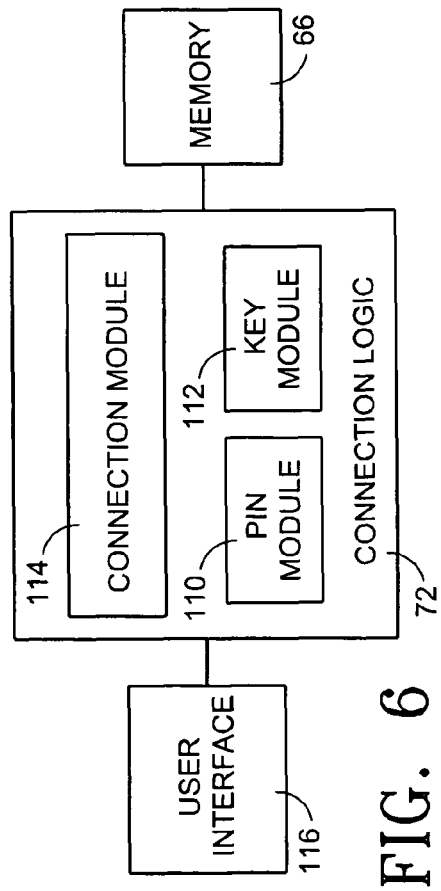
FIG. 5 illustrates a user table according to an embodiment of the present invention.
FIG. 6 is a block diagram showing connection logic program elements according to an embodiment of the present invention.
FIG. 7 illustrates a claimant pairing table according to an embodiment of the present invention.

FIGS. 4 and 5 illustrate exemplary data tables maintained in memory 48 and used by various components of security logic 60 in the performance of its functions. FIG. 4 illustrates PIN table 88 which is maintained by PIN module 76 and used by authentication module 80 to determine the validity of PIN data received from claimant device 42. PIN table 88 includes a number of entries 90 that each correspond to a given PIN. Each entry 90 includes data in a PIN data field 92, an access data field 94, and an expiration data field 96.

PIN data field 92 of an entry 90 contains PIN data. PIN data can be an exact replica of a PIN generated by PIN module 76 or a PIN modified using other data such as the device address of claimant device 42. Access data field 94 of a given entry 90 contains access data. Access data indicates the function or functions of verifying device 40 that can be accessed using a link key generated from PIN data in that entry 90. Expiration data field 96 of a given entry 90 contains expiration data. Expiration data specifies the circumstances under which PIN data in that entry 90 remains valid such as a time window or a number of uses.

FIG. 5 illustrates user table 98 that is maintained by user module 82 and key module 78. Authentication module 80 utilizes user table 98 to determine the validity of a link key received from claimant device 42 and to determine whether a claimant device supplying PIN data is authorized to establish a pairing with verifying device 40. User table 98 includes a number of entries 100 that each correspond to a given claimant device. Each entry 100 can include data in a claimant ID field 102, a key field 103, an access data field 104, and an expiration data field 105.

Data in claimant ID field 102 of a given entry 100 identifies a particular claimant device. For example, the claimant ID might be the device address for claimant device 42. Key field 103 of a given entry 100 contains a link key established for a particular claimant device identified by claimant ID field 102 of that entry 100. Access data field 104 of a given entry 100 contains access data associated with a particular claimant device identified by claimant ID field 102 of that entry 100. As noted above, access data indicates the function or functions of verifying device 40 that can be accessed using a link key contained in key field 104 in that entry 100. Expiration data field 105 of a given entry 100 contains expiration data. Expiration data specifies the circumstances under which the link key contained in key field 103 in that entry 100 remains valid.

As shown, user table 98 also includes multi-claimant indicator 106, and restriction indicator 108. Multi-claimant indicator 106 signals whether or not verifying device 40 is multi-claimant enabled. If multi-claimant enabled, verifying device 40 is allowed to establish pairings with multiple claimant devices. Indicator 106, for example, may be a flag that when set, signals that verifying device 40 either is or is not multi-claimant enabled. If verifying device 40 is multi-claimant enabled, restriction indicator 108 signals whether or not pairings are restricted to specified claimant devices. If pairings are restricted, the approved claimant devices can be identified by data in the claimant ID field 102 of entries 100. Indicator 108, for example, may be a flag that when set signals that access to verifying device 40 either is or is not restricted.

Consequently, user table 98 may have one or more entries 100 each containing data only in the claimant ID field of that entry 100. That data, for example, may be the device addresses of the approved claimant devices. Once a pairing is established between an approved claimant device and the verifying device, the remaining fields of an entry 100 identifying the claimant device are populated. Where pairings with verifying device 40 are restricted to specified claimant devices, user module 86 may, for example, create entries 100 in user table 98 populating only the claimant ID field 102 of each entry 100.

More specific examples of the operation of security logic 60 including its maintenance and utilization of PIN table 88 and claimant table 98 are described in the following section.

FIG. 6 is an exemplary block diagram illustrating the logical components of connection logic 72 (FIG. 2). Here, connection logic 72 includes PIN module 110, key module 112, and connection module 114. PIN module 110 represents generally any program capable of generating PIN data from a supplied PIN. As stated above, PIN data may be a PIN or a PIN modified using other data such as the device address of claimant device 42. Key module 112 represents a program capable of generating a link key using PIN data and maintaining data relating to a pairing established with claimant device 42. Connection module 114 represents generally any program capable of directing a connection request to verifying device 40.

Connection module 114 has access to memory 66 (FIG. 2) and user interface 116. User interface 116 represents generally any combination of hardware and associated programs that allow a user to supply claimant device 42 with a PIN. User interface 116 may, for example, include a traditional qwerty keypad, a more simple numeric keypad, or a touch screen. User interface 116 prompts a user to enter a PIN and then supplies an entered PIN to connection logic 114.

FIG. 7 illustrates an exemplary data table maintained in memory 66 (FIG. 6) and used by various components of connection logic 72 in the performance of their functions. Specifically, FIG. 7 illustrates claimant pairing table 118 which is maintained by key module 112 and used by connection module 114. Claimant pairing table 118 includes a number of entries 120 that each correspond to a given verifying device. Each entry 120 includes data in an ID field 122 and a key field 124. ID field 122 of a given entry contains data identifying a verifying device such as verifying device 40. That data, for example, might be the device address for that verifying device. Key field 118 of a given entry 120 contains a link key established for a verifying device identified by data in ID field 122 for that entry 120.

More specific examples of the operation of connection logic 114 including its maintenance and utilization of claimant pairing table 118 are described in the following section.

Figure 8:
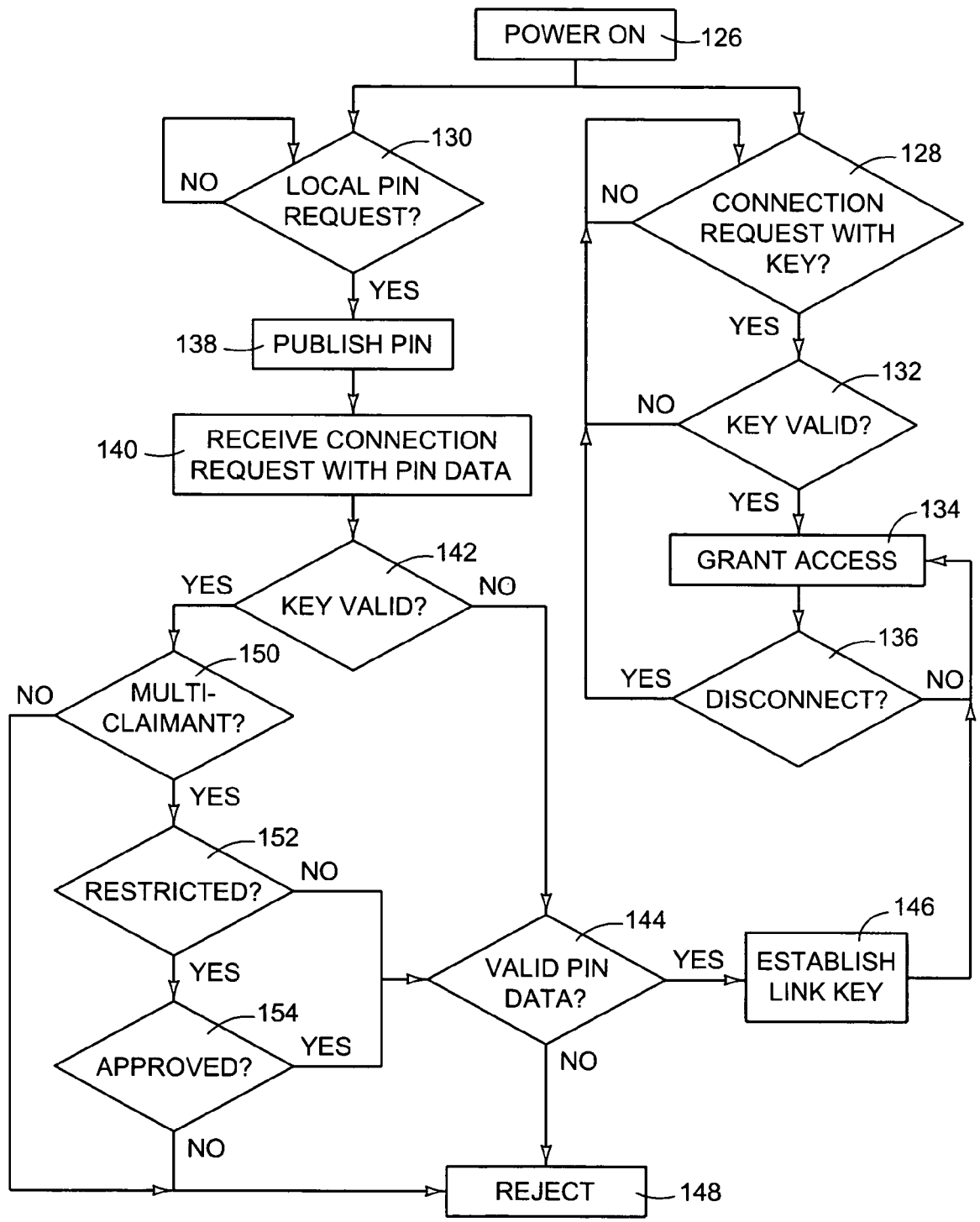
FIG. 8 is an exemplary flow diagram illustrating steps taken to generate a link key and authenticate a connection request according to an embodiment of the present invention.

OPERATION: The operation of embodiments of the present invention will now be described with reference to FIG. 8. FIG. 8 is an exemplary flow diagram that helps illustrate steps taken to establish and maintain a pairing between a claimant device and a verifying device.

A verifying device is powered on (step 126). The verifying device initializes and runs two processes. The verifying device waits for a connection request with a link key (step 128)—the receipt of which triggers the execution of the first process. The verifying device also waits for a local PIN request (step 130), the receipt of which triggers the second process. A local pin request is a request made using a button or other user interface control element provided by the verifying device. For example, the verifying device might include a button that when pressed directs the device to publish a PIN. An example of a non-local PIN request is a request that originates from a device other than the verifying device.

Upon receiving a connection request in step 128, the verifying device determines if the supplied link key is valid (step 132). If not, the process jumps back to step 128. If the link key is valid, the verifying device grants access to the claimant device that supplied the link key (step 134) and waits for the claimant device to disconnect (step 136).

Upon receiving a local pin request (step 130), the verifying device generates and publishes a PIN (step 138). The generated PIN may, for example, be associated with expiration data and access data. The published PIN is entered by a user into a claimant device. The claimant device generates PIN data and directs a connection request that includes the PIN data to the verifying device.

The verifying device receives the connection request containing the PIN data (step 140) and determines if a valid link key has already been established (step 142). If a valid link key has not been established, the verifying device determines if the PIN data is valid (step 144). If the PIN data is valid, the verifying device establishes a link key (step 146) and grants access (step 134). Otherwise, if the PIN data is invalid, the verifying device rejects the connection request (step 148).

If, in step 142, the verifying device instead determines that a valid link key exists, the verifying device determines if it is multi-claimant enabled (step 150). If not, the connection request received in step 140 is rejected in step 148. Otherwise, the verifying device determines whether restrictions exist on which particular claimant devices are allowed to establish pairings with the verifying device (step 152). If none exist, the process jumps to step 144 to determine the validity of the PIN data received with the connection request. Otherwise, the verifying device determines whether the claimant device making the connection request is approved (step 154). If approved, the process jumps to step 144 to determine the validity of the PIN data received with the connection request. Otherwise, the process jumps to step 148, and the connection request is rejected.

A more specific implementation of the processes shown in FIG. 8 will now be described with reference to components shown in FIGS. 2-7. Verifying device 40 is powered on and initialized (step 126). Upon receipt of a local PIN request in step 130, PIN module 76 (FIG. 3) generates a PIN and creates an entry 90 in PIN table 88 (FIG. 4). That entry includes a copy of the PIN as well as access data and expiration data associated with the PIN. Publishing module 86 (FIG. 3) then instructs functional components 44 (FIG. 2) to publish the PIN.

The PIN may be published as part of data included on a printed page (step 138). As an example, the local PIN request may be made when a user presses a button on verifying device 40. In response to the user's actions, PIN module 76 (FIG. 3) generates a PIN and supplies the PIN to publishing module 86. Publishing module 86 then directs print engine 52 (FIG. 2) to print a test page that includes the PIN.

With the aid of user interface 116 (FIG. 6), the user enters the published pin into claimant device 42 (FIG. 2). PIN module 110, using the PIN, assembles PIN data. Again the PIN data may be identical to the PIN, or, for example, the PIN data may be generated using the PIN and other data such as the device address of claimant device 42. Connection module 114 (FIG. 6) then directs a connection request that includes the PIN data to verifying device 40.

Connection module 84 (FIG. 3) receives the connection request (step 140) and supplies the accompanying PIN data to authentication module 80 (FIG. 3). Authentication module 80 determines if a valid link key has already been established for verifying device 40 (step 142). To do so, authentication module 80 examines user table 98 (FIG. 5) and ascertains whether or not table 98 contains an entry 100 with a valid link key. A valid link key is one that is contained in user table 98 that has not expired.

Assuming authentication module 80 determines that no valid link key exists, authentication module 80 determines the validity of the PIN data (step 144). To do so, authentication module 80 examines PIN table 88 (FIG. 4) and ascertains whether or not it has an entry 90 that contains matching PIN data. If PIN table 88 does have an entry 90 that contains matching PIN data, authentication module 80, using expiration data from that entry 90, determines whether or not that PIN data has expired. Authentication module 80 may also determine whether the connection request is for a function allowed by or not prohibited by access data associated with the matching PIN data. The connection request is not valid and the authentication module 80 rejects the connection request (step 148) if:

(1) matching PIN data cannot be found in PIN table 88,
(2) matching PIN data has expired, or
(3) the connection request is for a prohibited function.

Otherwise, the supplied PIN data is valid. Key module 78 (FIG. 3) uses the PIN data to generate a link key (step 146), and connection module 84 (FIG. 3) grants the connection request (step 134). Key module 78 also generates an entry 100 in user table 98. Included in that entry is a device address or other data uniquely identifying claimant device 40, the generated key, access data (if any) associated with the PIN data used to generate the link key, and expiration data.

With the connection request granted, key module 112 (FIG. 6) of claimant device 42 generates a link key using the PIN data supplied with the connection request. That link key matches the link key generated by key module 78 (FIG. 3) of verifying device 40. Key module 112 (FIG. 6) also adds an entry 120 to claimant pairing table 118. That entry 120 contains a device address or other data identifying verifying device 40 and the link key.

It was assumed above that authentication module 80 determined, in step 142, that no valid link key existed for verifying device 40 in user table 98. Now assume authentication module 80 determines otherwise. In this case, authentication module 80 accesses user table 98 (FIG. 5) and determines if verifying device 40 is multi-claimant enabled (step 150). If not, authentication module 80 rejects the connection request (step 148). Otherwise, authentication module 80 accesses user table 98 (FIG. 6) to determine if access to verifying device 40 is restricted to specified claimant devices (step 152).

If access is restricted, authentication module 80 determines whether claimant device 42 is approved (step 154). To do so, authentication module 80 accesses user table 98 to determine if it contains an entry 100 containing data—a device address, for example—identifying claimant device 42. If such an entry 100 is found, claimant device 42 is approved. Otherwise, it is not, and authentication module 80 rejects the connection request (step 148). If access to verifying device 40 is not restricted or if claimant device 42 is approved, authentication module 80, as described above, determines whether or not the PIN data supplied with the connection request is valid (step 144).

CONCLUSION: The schematic diagrams of FIGS. 1A-1C illustrate three exemplary environments in which embodiments of the present invention may be implemented. Implementation, however, is not limited to these environments. The diagrams of FIGS. 2-7 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 8 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for publishing a PIN for use in establishing a pairing between a claimant device and a printing device, comprising:
    the printing device detecting a local PIN request made by activation of a user interface control element provided by the printing device, wherein identifying a local request to print a page as the local pin request;
    the printing device generating the PIN in response to the local PIN request and without communicating with the claimant device;
    the printing device printing the PIN, wherein printing the PIN comprises printing a test page that includes the PIN;
    receiving a connection request from the claimant device, the connection request including PIN data assembled from the PIN; and
    generating a link key using the PIN data, the link key used for device pairing between the claimant device and the printing device.

2. The method of claim 1, identifying a local request to print a test page as the local PIN request and wherein printing the PIN comprises printing a test page that includes the PIN.

3. The method of claim 1, further comprising determining the validity of the PIN data prior to generating the link key.

4. The method of claim 3, wherein determining includes determining if the PIN data corresponds to the PIN, determining if the generated PIN has expired, and rejecting the connection request if the PIN data does not correspond to the PIN or if the PIN has expired.

5. The method of claim 1, further comprising rejecting the connection request if the connection request is for a function not associated with the PIN data.

6. A method for establishing a pairing between a claimant device and a verifying device, comprising:
    detecting a local PIN request made by activation of a user interface control element provided by the verifying device, wherein detecting a local request to print a page as the local PIN request;
    generating a PIN in response to the local PIN request and without communicating with the claimant device;

instructing the verifying device to print the PIN, wherein printing the PIN comprises printing a page that includes the PIN;

receiving from the claimant device a connection request for the verifying device, the connection request including PIN data;

determining whether a link key exists for the verifying device;

if a link key exists:
rejecting the connection request if the verifying device is not multi-claimant enabled;
rejecting the connection request if the verifying device is multi-claimant enabled with restricted access and the claimant device is not approved;

otherwise, upon a determination that the PIN data is valid, generating a link key from the PIN data to establish a pairing between the claimant device and the verifying device.

7. The method of claim 6, wherein the PIN and the PIN data are of the same format and wherein determining the validity of the PIN data includes determining if the PIN data matches the generated PIN.

8. The method of claim 6, wherein determining the validity of the PIN data comprises:
acquiring a unique identifier for the claimant device;
constructing verifying PIN data using the unique identifier and the generated PIN;
determining if the PIN data matches the verifying PIN data.

9. A method for establishing a pairing between a claimant device and a printing device, comprising:
detecting a local request to print a test page made by activation of a user interface control element provided by the printing device;
generating a PIN in response to the local request to print the test page and without communicating with the claimant device;
instructing the printing device to print a test page that includes the PIN;
receiving from the claimant device a connection request, the connection request including PIN data;
determining whether a valid link key exists exist for the printing device;
if a valid link key exists:
rejecting the connection request if the printing device is not multi-claimant enabled;
rejecting the connection request if the printing device is multi-claimant enabled with restricted access and the claimant device is not approved;
otherwise, upon a determination that the PIN data is valid, generating a link key from the PIN data to establish a pairing between the claimant device and the printing device.

10. A non-transitory computer readable medium having instructions for:
detecting a local PIN request made by activation of a user interface control element provided by a printing device, wherein detecting a local request to print a page as the local PIN request;
generating a PIN in response to a local PIN request and without communicating with the claimant device;
printing the PIN, wherein printing the PIN comprises printing a page that includes the PIN;
receiving a connection request from the claimant device, the connection request including PIN data assembled from the PIN; and
generating a link key using the PIN data to establish a device pairing between the printing device and the claimant device.

11. The medium of claim 10, wherein the local PIN request is a local request to print a test page, and wherein the instructions for printing include instructions for printing a test page that includes the PIN.

12. The medium of claim 10, having further instructions for determining the validity of the PIN data prior to generating the link key.

13. The medium of claim 12, wherein the instructions for determining include instructions for determining if the PIN data corresponds to the PIN, determining if the generated PIN has expired, and rejecting the connection request if the PIN data does not correspond to the PIN or if the PIN has expired.

14. The medium of claim 10, having further instructions for rejecting the connection request if the connection request is for a function not associated with the PIN data.

15. A non-transitory computer readable medium having instructions for:
detecting a local PIN request made by activation of a user interface control element provided by the verifying device, wherein detecting a local request to print a page as the local PIN request;
generating a PIN in response to a local PIN request and without communicating with the claimant device;
instructing the verifying device to print the PIN, wherein printing the PIN comprises printing a page that includes the PIN;
receiving from a claimant device a connection request, the connection request including PIN data;
determining whether a link key exists for a verifying device;
if a link key exists:
rejecting the connection request if the verifying device is not multi-claimant enabled;
rejecting the connection request if the verifying device is multi-claimant enabled with restricted access and the claimant device is not approved;
otherwise, upon a determination that the PIN data is valid, generating a link key from the PIN data to establish a pairing between the claimant device and the verifying device.

16. The medium of claim 15, wherein the PIN and the PIN data are of the same format and wherein the instructions for determining the validity of the PIN data include instructions for determining if the PIN data matches the generated PIN.

17. The medium of claim 15, wherein the instructions for determining the validity of the PIN data include:
acquiring a unique identifier for the claimant device;
constructing verifying PIN data using the unique identifier and the generated PIN;
determining if the PIN data matches the verifying PIN data.

18. A non-transitory computer readable medium having instructions for:
detecting a local request to print a test page made by activation of a user interface control element provided by a printing device;
generating a PIN in response to local request to print a test page and without communicating with the claimant device;
instructing the printing device to print a test page that includes the PIN;
receiving from a claimant device a connection request, the connection request including PIN data;
determining whether a valid link key exists for the printing device;

if a valid link key exists:
  rejecting the connection request if the printing device is not multi-claimant enabled;
  rejecting the connection request if the printing device is multi-claimant enabled with restricted access, and the claimant device is not approved;
  otherwise, upon a determination that the PIN data is valid, generating a link key from the PIN data to establish a pairing between the claimant device and the printing device.

19. A system for publishing a PIN for use in establishing a pairing between a claimant device and a printing device, comprising:
  hardware;
  a PIN module implemented at least by the hardware and operable to receive a local PIN request made by activating a user interface control element provided by the verifying device, wherein receiving a local request to print a page as the local PIN request, module being operable to generate the PIN in response to the local PIN request and without communicating with the claimant device;
  a publishing module implemented at least by the hardware and operable to direct a print engine for the printing device to print the PIN, wherein printing the PIN comprises printing a page that includes the PIN;
  a connection module implemented at least by the hardware and operable to receive a connection request from the claimant device, the connection request including PIN data assembled from the PIN; and
  a key module implemented at least by the hardware and operable to generate a link key using the PIN data, the link key used for paring the claimant device with the verifying device.

20. The system of claim 19, wherein the local PIN request is a local request to print a test page, and wherein the publishing module is operable to identify the request, to direct the PIN module to generate the PIN, and to direct the print engine to print a test page that includes the PIN.

21. The system of claim 19, further comprising an authentication module operable to validate the PIN data and to instruct the key module to generate a link key upon a determination that the PIN data is valid.

22. The system of claim 21, wherein the authentication module is operable to determine if the PIN data corresponds to the PIN, to determine if the generated PIN has expired, and to reject the connection request if the PIN data does not correspond to the PIN or if the PIN has expired.

23. The system of claim 19, further comprising an authentication module operable to reject the connection request if the connection request is for a function not associated with the PIN data.

24. A system for establishing a pairing between a claimant device and a verifying device, comprising:
  hardware;
  a PIN module implemented at least by the hardware and operable to receive a local PIN request made by activating a user interface control element provided by the verifying device, wherein receiving a local request to print a page as the local PIN request, module being operable to generate a PIN in response to the local PIN request and without communicating with a claimant device;
  a publishing module implemented at least by the hardware and operable to direct a print engine for the printing device to print the PIN, wherein printing the PIN comprises printing a page that includes the PIN;
  a connection module implemented at least by the hardware and operable to receive from the claimant device a connection request, the connection request including PIN data;
  an authentication module implemented at least by the hardware and operable:
    to determine whether a valid link key exists for the verifying device;
    to reject the connection request if the verifying device is not multi-claimant enabled and a valid link key exists;
    to reject the connection request if the verifying device is multi-claimant enabled with restricted access and the claimant device is not approved;
    to determine the validity of the PIN data and reject the connection request upon a determination that the PIN data is not valid; and
  a key module operable to generate a link key from the PIN data to establish a pairing between the claimant device and the verifying device.

25. The system of claim 24, wherein the PIN and the PIN data are of the same format and wherein the authentication module is operable to determine the validity of the PIN data by determining if the PIN data matches the generated PIN.

26. The system of claim 24, wherein the authentication module is operable to validate the PIN data by:
  acquiring a unique identifier for the claimant device;
  constructing verifying PIN data using the unique identifier and the generated PIN;
  determining if the PIN data matches the verifying PIN data.

27. A system for establishing a pairing between a claimant device and a printing device, comprising:
  hardware;
  a PIN module implemented at least by the hardware and operable to receive a local request to print a test page made by activating a user interface control element provided by a printing device, the pin module being operable to generate a PIN in response to the local request to print the test page and without communicating with the claimant device;
  a publishing module implemented at least by the hardware and operable to instruct the printing device to print a test page that includes the PIN;
  a connection module implemented at least by the hardware and operable to receive from the claimant device a connection request, the connection request including PIN data;
  an authentication module implemented at least by the hardware and operable:
    to determine whether a link key exists for the verifying device and if a link key exists;
    to reject the connection request if the verifying device is not multi-claimant enabled;
    to reject the connection request if the verifying device is multi-claimant enabled with restricted access and the claimant device is not approved;
    to determine the validity of the PIN data and reject the connection request if the PIN data is not determined to be valid; and
  a key module operable to generate a link key from the PIN data to establish a pairing between the claimant device and the verifying device.

* * * * *

UNITED STATES PATENT AND TRADEMARK OFFICE
CERTIFICATE OF CORRECTION

PATENT NO. : 7,941,665 B2  Page 1 of 1
APPLICATION NO. : 10/728495
DATED : May 10, 2011
INVENTOR(S) : Alan C. Berkema et al.

It is certified that error appears in the above-identified patent and that said Letters Patent is hereby corrected as shown below:

In column 10, line 35, in Claim 1, delete "pin" and insert -- PIN --, therefor.

In column 11, line 43, in Claim 9, delete "exists exist" and insert -- exists --, therefor.

In column 13, line 19, in Claim 19, before "module" insert -- the PIN --.

In column 13, line 60, in Claim 24, before "module" insert -- the PIN --.

In column 14, line 38, in Claim 27, delete "pin" and insert -- PIN --, therefor.

Signed and Sealed this
Eighth Day of November, 2011

David J. Kappos
*Director of the United States Patent and Trademark Office*